June 17, 1930.  C. SCHRAMM ET AL  1,765,349
CASING-IN MACHINE
Filed Dec. 10, 1929  12 Sheets-Sheet 1
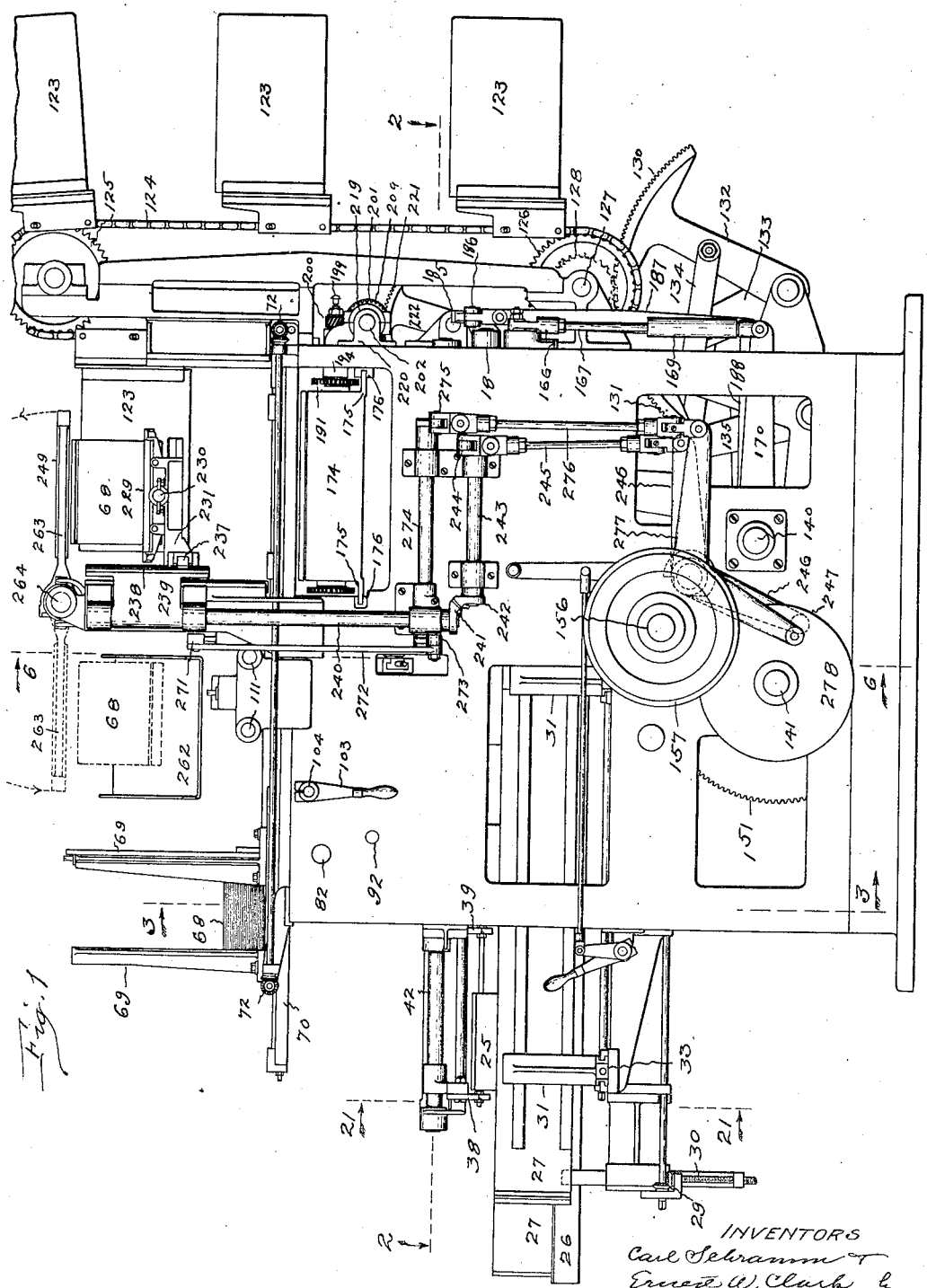

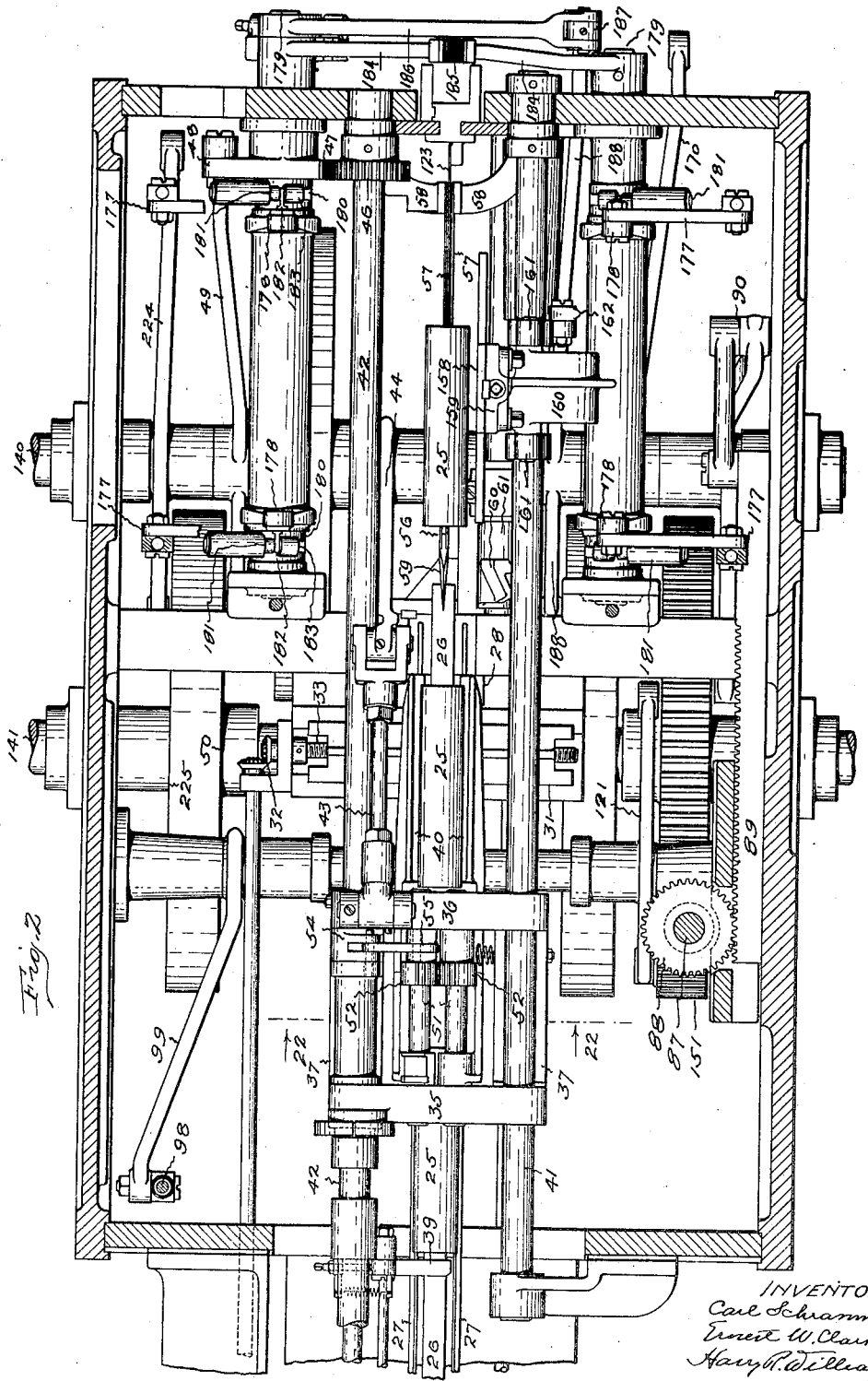

June 17, 1930.　　　C. SCHRAMM ET AL　　　1,765,349
CASING-IN MACHINE
Filed Dec. 10, 1929　　12 Sheets-Sheet 4
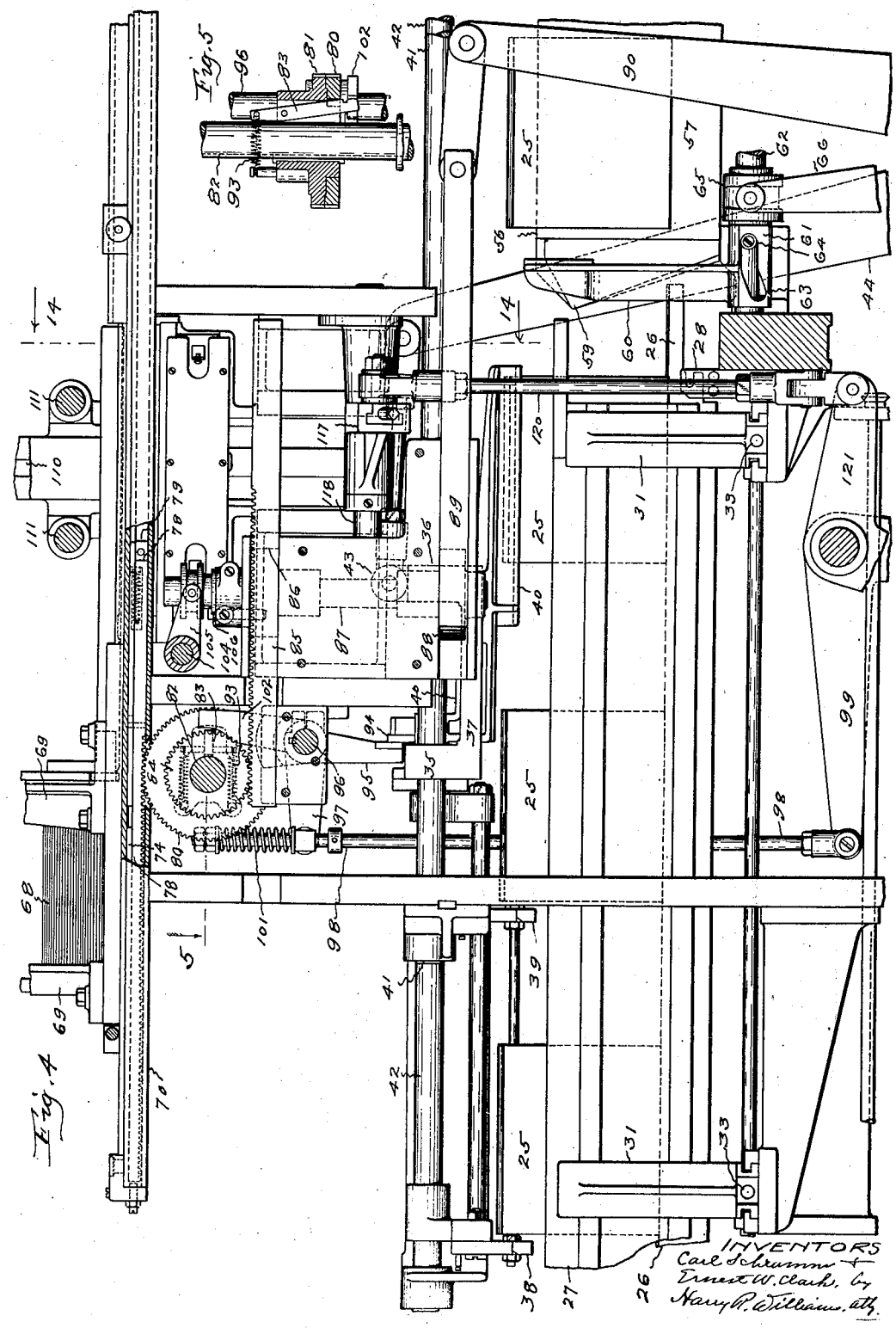

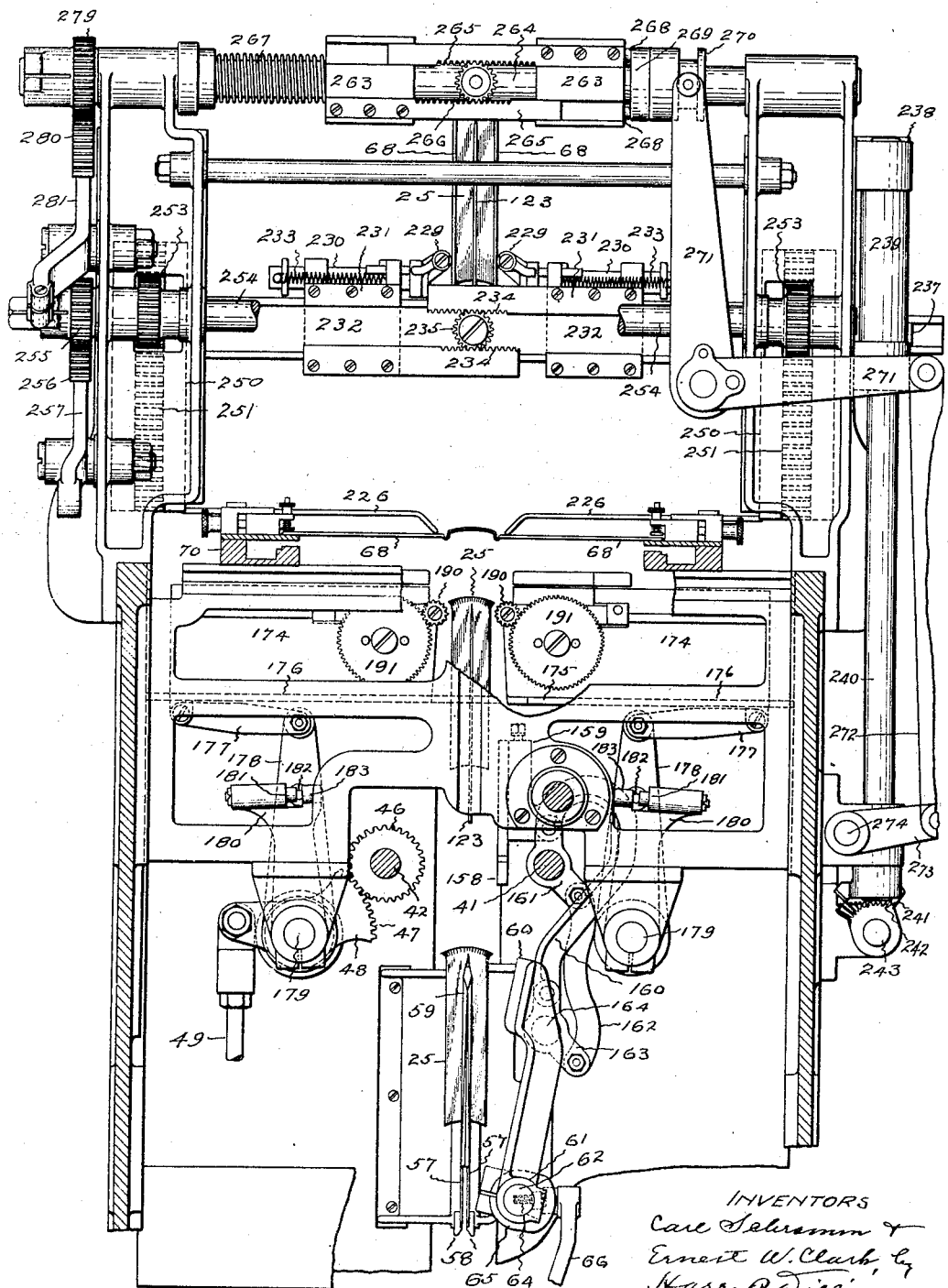

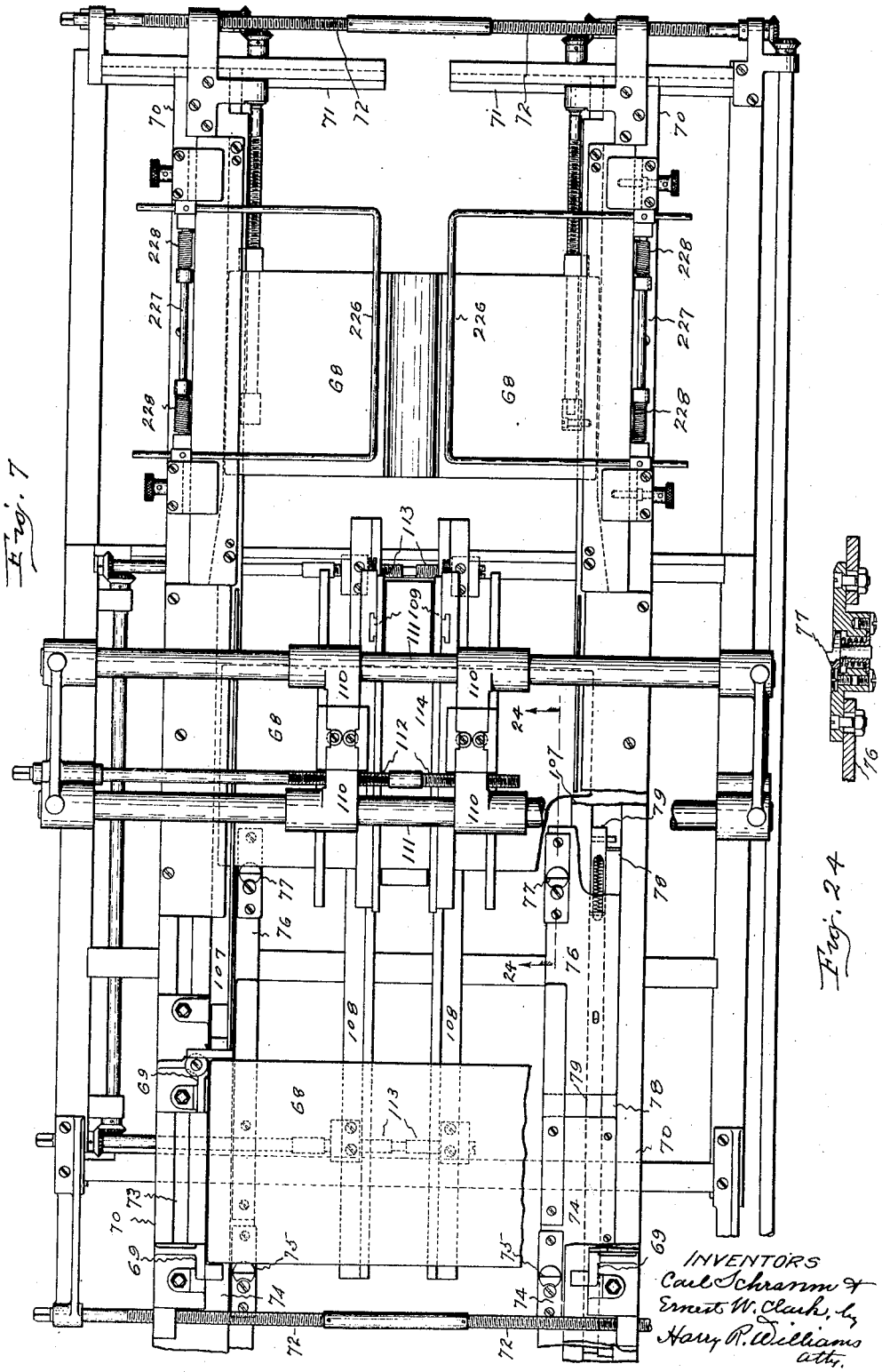

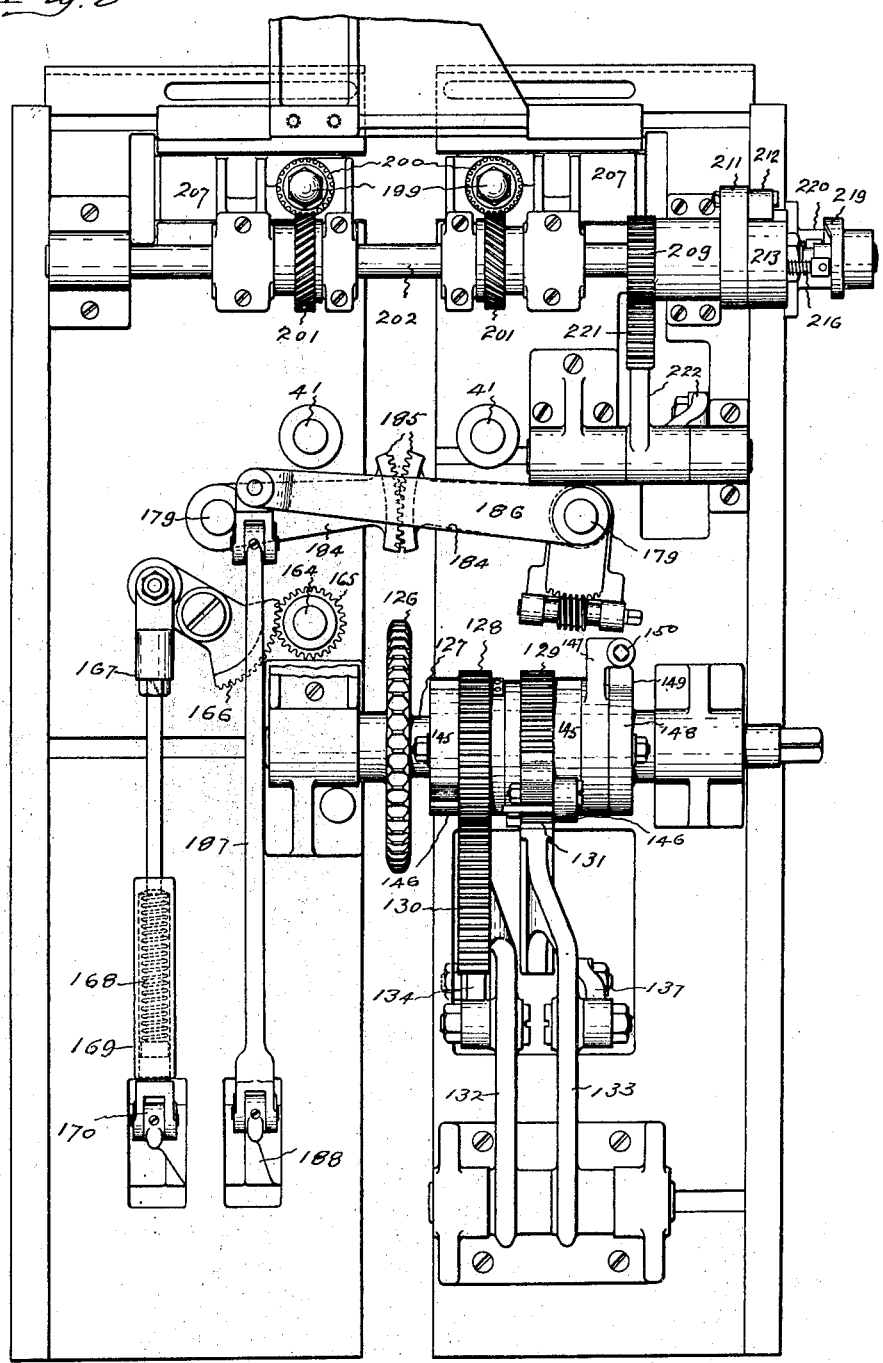

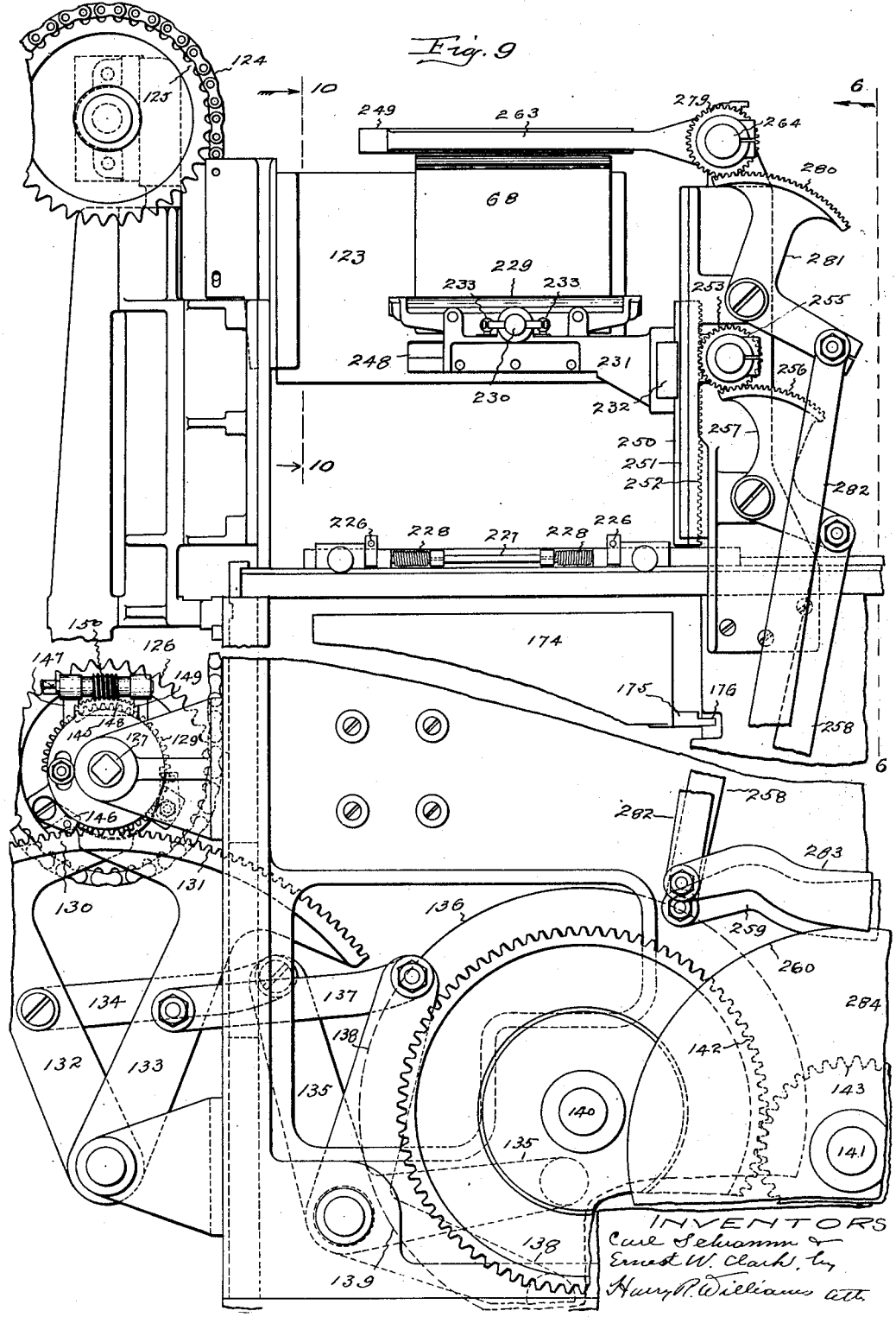

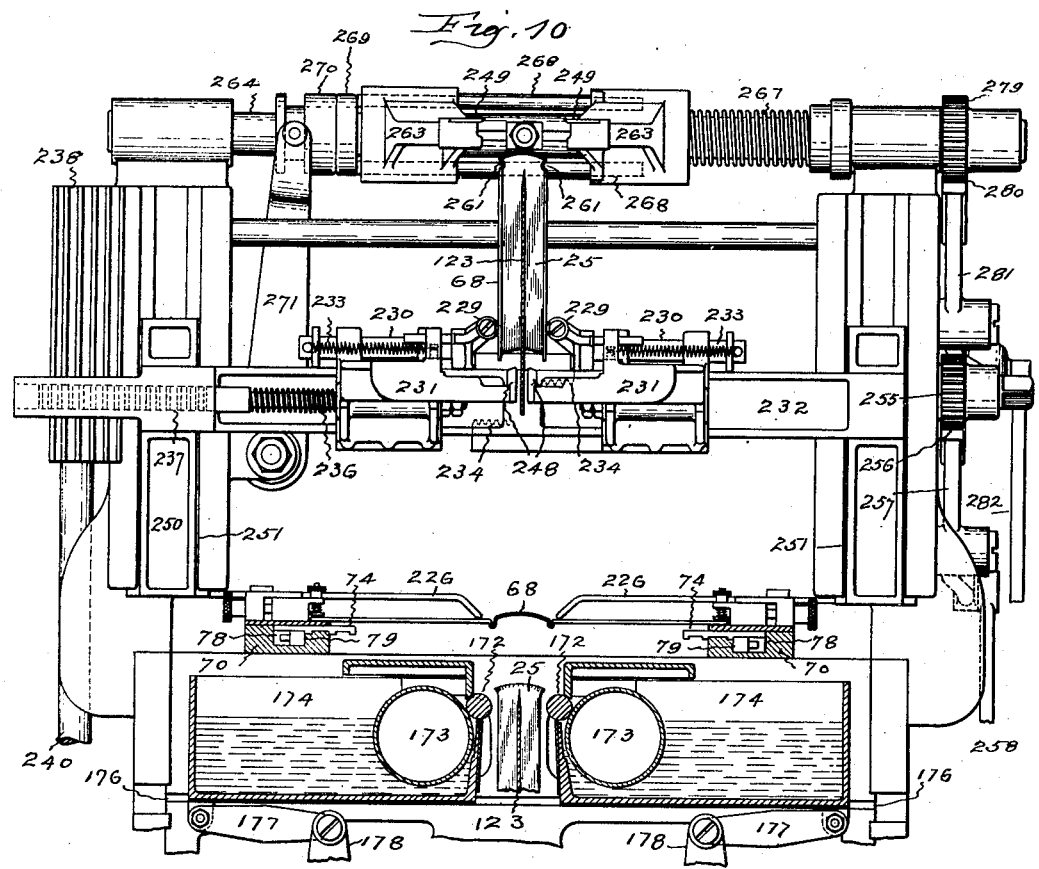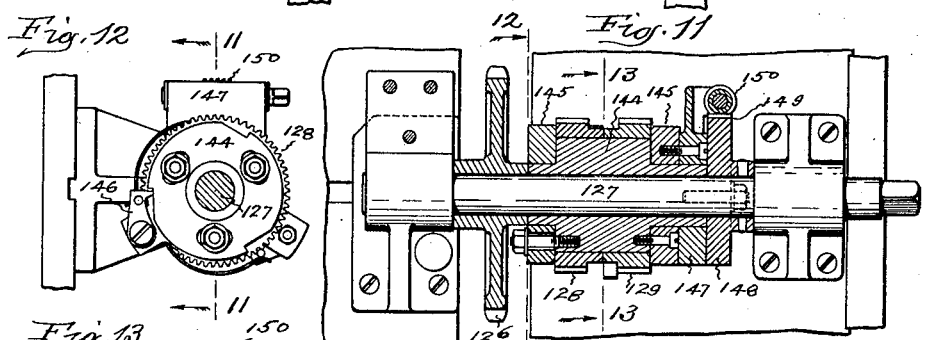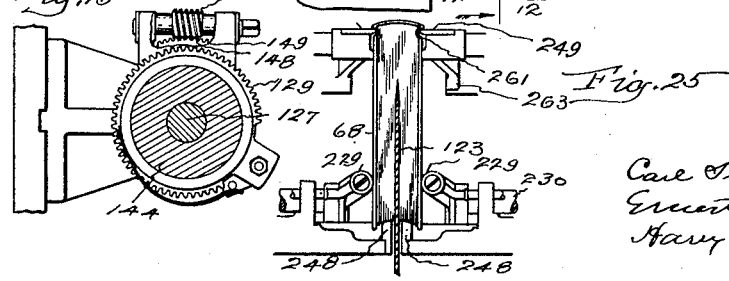

June 17, 1930.  C. SCHRAMM ET AL  1,765,349
CASING-IN MACHINE
Filed Dec. 10, 1929  12 Sheets-Sheet 10
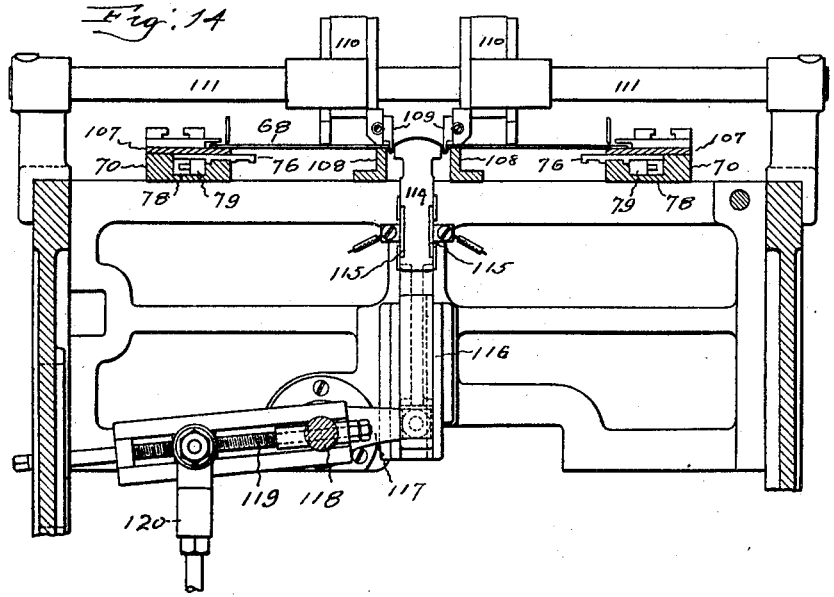
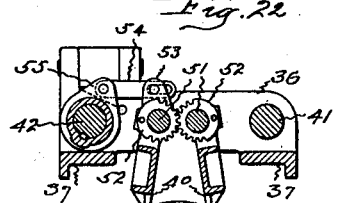
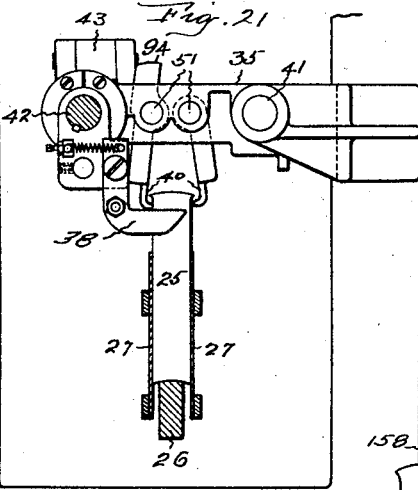
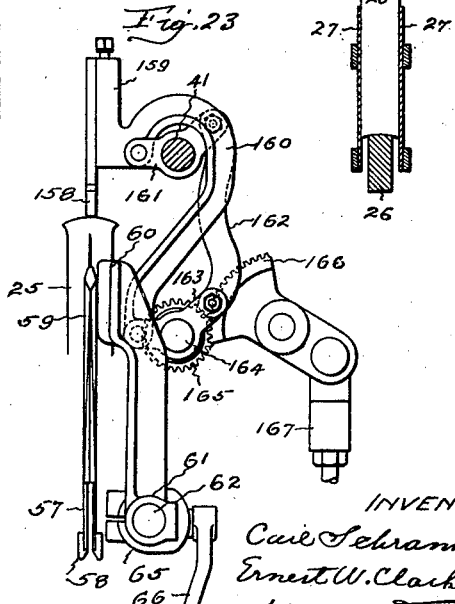

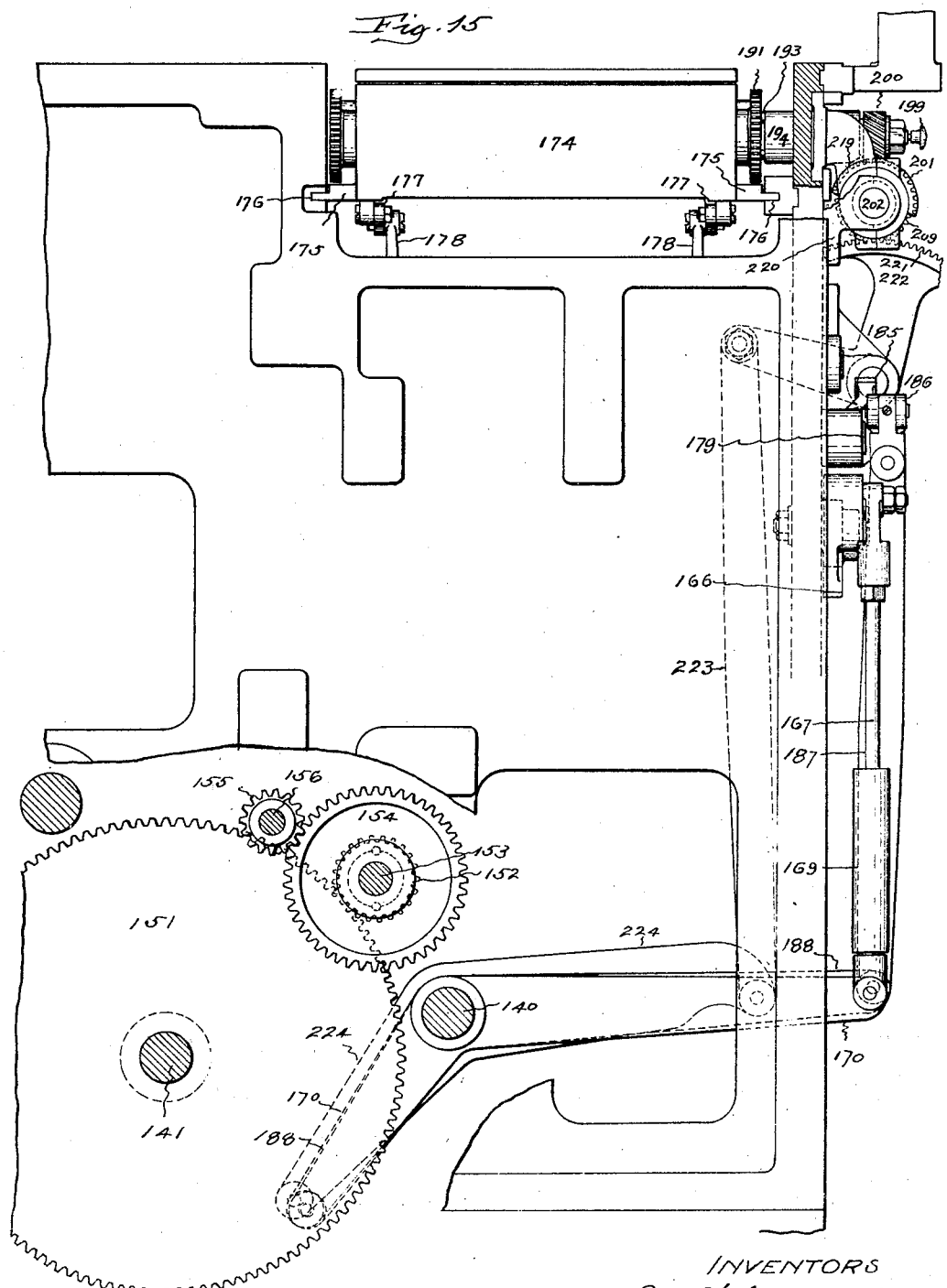

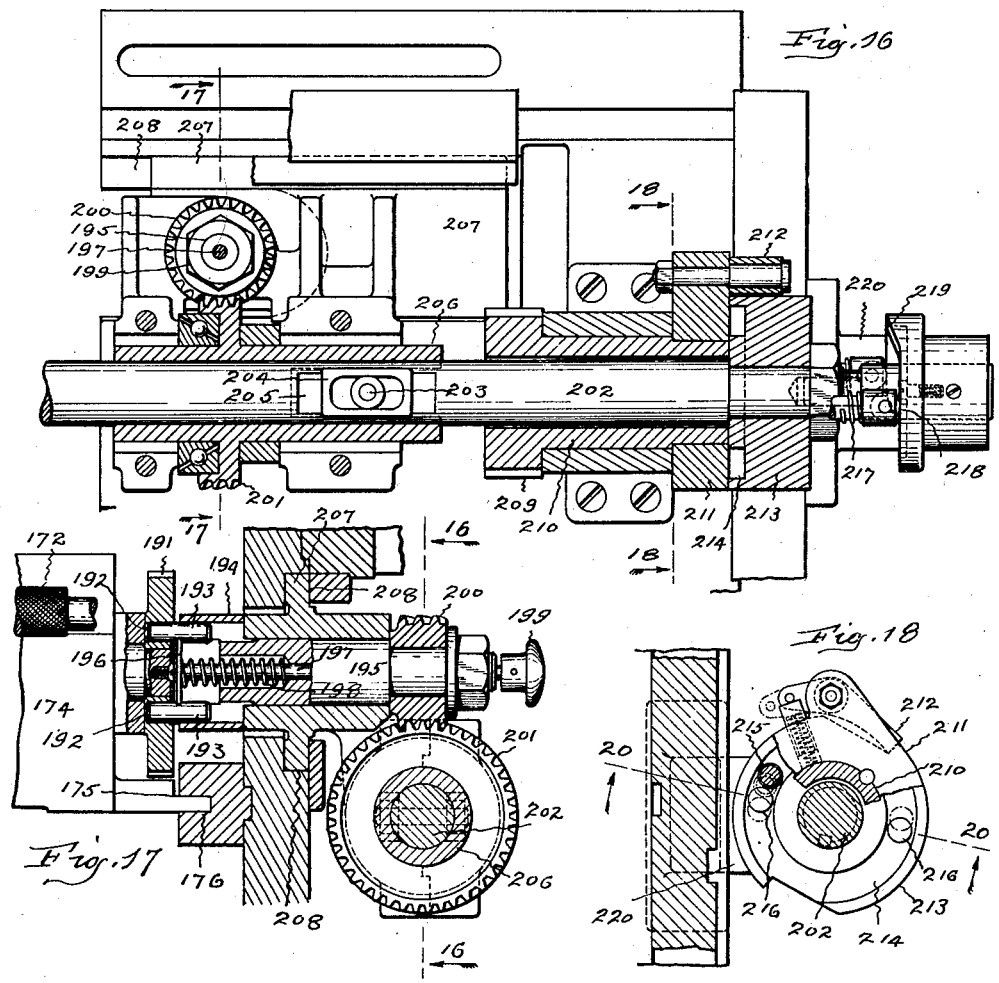

Patented June 17, 1930

1,765,349

UNITED STATES PATENT OFFICE

CARL SCHRAMM, OF WEST HARTFORD, AND ERNEST WAYNE CLARK, OF HARTFORD, CONNECTICUT, ASSIGNORS TO THE SMYTH MANUFACTURING COMPANY, OF HARTFORD, CONNECTICUT, A CORPORATION OF CONNECTICUT

CASING-IN MACHINE

Application filed December 10, 1929. Serial No. 413,044.

This invention relates to a machine for binding books, that is, a machine which applies the cases to the fillers.

The object of the invention is to produce a machine for automatically applying cases to fillers, having mechanisms that are so synchronized and which co-operate in such manner that the machine may be run very rapidly and will deliver a large output of finished books, which mechanisms are so designed that they may be adjusted for binding books of different thicknesses, widths and heights.

In the machine illustrated the fillers are fed edgewise along a horizontal track and positioned on a saddle, and the opened cases are fed flatwise from a stack passing between back formers to a position above the saddle. The fillers are lifted by an elevator from the saddle to the cases passing upward between means which apply adhesive to their outer leaves. The cases and fillers are then carried up and the cases folded down and pressed against the adhesive-coated sides of the fillers, and finally the books are grasped adjacent to the backs and lifted from the elevating means and discharged from the machine.

In the accompanying drawings Fig. 1 shows a side elevation of the machine. Fig. 2 is a horizontal section on larger scale looking down from the plane indicated by the dotted line 2—2 on Fig. 1. Fig. 3 is an end elevation with the frame cut in section on the plane indicated by the dotted line 3—3 on Fig. 1. Fig. 4 is a side elevation with the side plate of the frame removed and portions broken away. Fig. 5 is a detail of a portion of the filler feed mechanism on the section denoted by the dotted line 5—5 on Fig. 4. Fig. 6 is a vertical section on the dotted line 6—6 on Fig. 1. Fig. 7 is a plan showing the case feed mechanism. Fig. 8 is an elevation showing a part of the elevator operating mechanism and adhesive applying mechanism. Fig. 9 is a side view showing a part of the elevating and book discharging mechanisms. Fig. 10 is a vertical section on the plane indicated by the dotted line 10—10 on Fig. 9, showing the adhesive applying means, the case press means, and book lifting means. Fig. 11 shows a detail of a portion of the elevator-operating mechanism, the section being taken on the plane indicated by the dotted line 11—11 on Fig. 12. Fig. 12 is a section on the plane indicated by the dotted line 12—12 on Fig. 11. Fig. 13 is a section on the plane indicated by the dotted line 13—13 on Fig. 11. Fig. 14 is a section showing a portion of the filler-lifting and the case back-forming means, taken on the plane indicated by the dotted line 14—14 on Fig. 4. Fig. 15 is an elevation of the adhesive roll operating mechanism. Fig. 16 is a sectional elevation of a portion of the gluing mechanism on the plane indicated by the dotted line 16—16 on Fig. 17. Fig. 17 is a section on the plane indicated by the dotted line 17—17 on Fig. 16. Fig. 18 is a section on the plane indicated by the dotted line 18—18 on Fig. 16. Fig. 19 is a view similar to Fig. 18 with the parts in different positions. Fig. 20 is a section on the plane indicated by the dotted line 20—20 on Fig. 18. Fig. 21 is a detail showing a filler feed finger and the feed clamp jaws, the section being approximately on the plane of the dotted line 21—21 on Fig. 1. Fig. 22 is a section of the feed clamp jaws taken on approximately the plane denoted by the dotted line 22—22 on Fig. 2. Fig. 23 is a detail side view of the means for leveling the fillers on the elevator blades. Fig. 24 is a section on the plane indicated by the dotted line 24—24 on Fig. 7, showing one of the case feeding catches. Fig. 25 is a detail showing the cased filler lifted and grasped by the discharge jaws.

The fillers 25 are by hand placed one at a time edgewise with their fronts down on a bar 26 between two vertical guide plates 27, Figs. 1, 3, 5. The bar extends from the front toward the rear and is supported near each end by posts 28 adapted to be adjusted vertically by means of crank operated bevel gears 29 and screws 30, Fig. 1, so that the bar may be raised and lowered according to the width of the fillers. The plates are supported by slide brackets 31, Figs. 1, 4, that may be transversely adjusted by crank operated bevel gears 32 and screws 33, Fig. 2, so that the plates may be opened and closed from each other according to the thickness of the fillers.

The fillers are fed into the machine along the bar by a carrier unit which comprises two cross bars 35, 36, connected by tie bars 37, two fingers 38, 39, and a pair of clamp jaws 40, Figs. 2, 3, 21, 22. These elements are connected so as to reciprocate together toward and from the back and front of the machine, and they are supported by, and move horizontally along a fixed shaft 41 and an oscillatory shaft 42, Figs. 2, 3, 4. The cross bar 36 is connected by a link 43 with the upper end of a lever 44, Fig. 2, that at its lower end is engaged by a cam 45, Fig. 3, the rotation of which causes the simultaneous reciprocation of the feed fingers and clamping jaws.

The feed fingers, while they are movable along the shafts, are connected with the shaft 42 so as to oscillate therewith. This oscillation is accomplished by a gear 46 on the rear end of the shaft 42 that is engaged by a segment 47 on a rocker 48, Figs. 2, 6, that is connected with the upper end of a lever 49, the lower end of which is engaged by a cam 50, Fig. 3. The clamp jaws 40 are pivotally mounted on short axles 51 supported by the cross bars 35, 36, and they are provided with intermeshing pinions 52, Figs. 2, 3, 22. The clamp jaws are normally closed by springs 34, Fig. 3. One of the jaws has an upwardly extending lug 53 that by a link 54 is connected with a rocker 55 which, while movable along the shaft 42 with the carrier, is so connected with that shaft that it oscillates therewith, Fig. 22, and causes the jaws to open. By means of this mechanism the fingers turn in and the clamp jaws close approximately at the same time and the fingers turn out and the clamp jaws open similarly, and these members advance and return together. The finger 38 turns in back of a filler placed in the entrance way and pushes it along to the finger 39, which in turn pushes the filler into the clamp jaws 40 that in turn carry the filler onto a saddle 56. Thus, when the machine is in full operation there are three fillers being successively advanced by the carrier toward the saddle.

The saddle comprises two plates 57 with a space between them, supported vertically by brackets 58 and at the front edge of the saddle and projecting forwardly into the path of the fillers is a pointed blade 59 which separates the mid leaves of the filler as it is brought onto the saddle by the carrier jaws, so that the filler will be located centrally on the saddle, Figs. 2, 4, 6.

The filler is pushed to correct position on the saddle by a header arm 60, Figs. 4, 6, that is swung toward the saddle from one side and then is moved horizontally against the bottom edge of the filler. The hub 61 of the header arm is rotatably and longitudinally movable on a shaft 62 and is provided with a spiral groove 63 through which a stud 64 extends into the shaft. Connected with the hub 61 is a collar 65 which is engaged by the upper end of a lever 66, Fig. 4. The lower end of this lever is engaged by a cam 67, Fig. 3, the rotation of which causes the header arm to swing in and push the filler to position, and then move back and swing out.

In the meantime the cases 68 which are stacked in the magazine at the front of the machine are fed one at a time above the filler on the saddle. The case magazine consists of vertical corner posts 69, Figs. 1, 7, which are adjustably mounted on rails 70 so that they may be set for cases of different widths and lengths. The rails 70 are movably supported at their ends near the front and back of the machine by portions of the frame 71 so that they may be adjusted toward and from each other by screws 72, and the posts 69 are adjustable longitudinally of the rails in the mortises 73, Fig. 7.

Beneath the outer edges of the cases are two horizontally movable slides 74 which have upwardly pressed spring catches 75 that as the slides move forward engage the lowest case of the pile in the magazine and carry it into position over two similar slides 76 which have spring catches 77, Fig. 7. When the case feeding slides return the spring catches are depressed and pass under the cases to position to engage the following cases on the next forward movement of the slides.

The slides 74 are attached to racks 78 and the slides 76 are attached to racks 79. The two racks 78 and 79 on each side lie parallel and side by side in grooves in the rails 70, and the racks 78 are engaged by gears 80 and the racks 79 are engaged by gears 81. The gears on each side are arranged side by side, Fig. 3, the gears 81 being keyed to the shaft 82 and the gears 80 being connected to the gears 81 by clutch keys 83, Figs. 3, 5. Attached to the shaft 82 is a gear 84 that is engaged by a rack 85 with teeth on two faces, Figs. 3, 4. This rack is engaged by a gear 86 at the upper end of a shaft 87 that at its lower end has a gear 88 engaged by a rack 89 which is adapted to be reciprocated by a lever 90 that is oscillated by a cam 91, Fig. 3. By this mechanism the slides are advanced and returned to successively feed the cases from the magazine.

When the machine is in operation and is feeding fillers the clutch keys 83 connect the gears 80 and 81 so that the cases will be fed, springs 93, Figs. 4, 5, causing the keys to normally engage the gears. Should a filler fail to feed, the gears 80 are disconnected from the gears 81 so as to stop the feed of the cases. Extending upward from one of the clamp jaws 40 is a lug 94 that when the jaws are opened and grasping a filler, extends into the path of an arm 95 that projects downward from a shaft 96 which is parallel with the shaft 82, Figs. 3, 4, 5. This shaft 96 at one end has an arm 97 through which extends a rod 98 that at its lower end is connected with angle lever 99 oscillated by a cam 100.

Between the lug 97 and the upper end of the rod 98 is a spring 101. Extending up from the shaft 96 are arms 102, Figs. 3, 4. These arms project adjacent to the clutch keys 83. The cam 100 through the lever 99, rod, 98 and lug 97 tends to rock the shaft 96. If a filler is grasped by the clamp jaws 40 these jaws are held open so that the lug 94 engages with the arm 95 that projects from the middle of the shaft 96, as shown in Fig. 3. When these parts engage the shaft 96 is not rocked, the spring 101 yielding as the rod 98 is pulled down by the cam 100. If a filter fails to feed into the clamp jaws 40 the springs 34 draw them closed and then the lug 94 is moved out of line with the arm 95. When this condition arises the shaft 96 is rocked from the cam 100 so that the arms 102 will engage with the clutch keys 83 and cause the disconnection of the gears 80 from the gears 81. With these gears thus disconnected the slides 74 will not be moved forward and consequently no case will be fed from the magazine.

Should it be desired to entirely disengage the case feed, the handle 103 shown on the side of the machine in Fig. 1, is turned so as to rock the shaft 104 and cause the arm 105 on this shaft to move the clutch 106 and disengage the gear 86 from the shaft 87, Fig. 4.

The movement of the front feed slides 74 carries the case with its side edges supported by plates 107 and its back supported by rails 108 to a position below creasing blades 109 that are vertically adjustable on brackets 110 which are horizontally adjustable on shafts 111, so that the creasing blades may be set up or down and toward or from each other according to the thickness of the back of the case, Fig. 14. The brackets are adjusted by screws 112 and the rails 108 are adjusted by screws 113, Fig. 7. When the case is in this position a forming head 114 is lifted so as to shape its back, Fig. 14. This head is provided with electric heaters 115 connected with any suitable source of current. The head is moved up and down in a way 116 by one end of a lever 117 that is pivoted on a shaft 118. Adjustably connected with one end of this lever by a screw 119 is the upper end of a link 120, Figs. 4, 14. The lower end of this link is connected with an angle lever 121, Figs. 3, 4, which is oscillated at the proper times by a cam 122, Fig. 3, for lifting the forming head against the under side of the back of the case so as to shape the back and form the required creases. After the back of the case is shaped the inner slide 76 feeds the case to a position above the saddle. When the machine is in normal operation and a case is being carried by the inner slides from the back-former to position above the saddle, another case is brought by the front feed slides over the back-former.

The fillers are lifted from the saddle and carried up between means that apply adhesive to the sides, then to the cases and finally with the cases, to mechanism which discharges the cased fillers from the machine, by means of a plurality of blades 123 that are attached to an intermittently fed endless chain 124. The chain passes over a sprocket wheel 125 at the top of the machine and around a sprocket wheel 126 near the bottom of the machine, Figs. 1, 9. On the shaft 127 to which the sprocket wheel 126 is fastened, are two pinions 128, 129 that are engaged by two segmental racks 130, 131 at the upper end of the rockers, 132, 133, Figs. 8, 9. The rocker 132 is connected by a link 134 with an angle lever 135 that is engaged by a cam 136, and the rocker 133 is connected by a link 137 with an angle lever 138, Fig. 9, which is engaged by a cam 139, Figs. 3, 9, the cams being fastened on a shaft 140 which is parallel with the main cam shaft 141, Figs. 3, 9. The shaft 140 has a gear 142 that is engaged by a pinion 143, Fig. 9, on the main cam shaft, the ratio of this pinion and gear being such that the cams 136 and 139 on the shaft 140 will make one revolution to two revolutions of the main cam shaft, and these cams are so timed that the segmental racks are oscillated alternately.

The pinions 128, 129 with which the segmental racks engage, are rotatably mounted on a sleeve 144 that is loose on the shaft 127 which carries the lower sprocket wheel 126, Fig. 11. Fastened to the ends of this sleeve are ratchet wheels 145 and attached to the pinions 128, 129 are pawls 146 which engage with the ratchet wheels, Figs. 9, 11, 12, 13. The rack 130 rotates the pinion 128 and through the pawl and ratchet wheel feeds the sprocket chain one step and while the rack 130 is returning the rack 131 rotates the pinion 129 and through its pawl and ratchet wheel drives the sprocket chain the next step. By this means the elevator blades carried by the sprocket chain are given an easy intermittent feed by the alternate actions of the segmental racks and pinions during each cycle of movement of the other mechanisms.

In order that the elevator blades may be accurately set with relation to the other mechanisms the sleeve 144, Fig. 11, is adjustably connected with the sprocket shaft 127. Fastened to one of the ratchet wheels 145 is a plate 147 and adjacent to this and fastened to the shaft 127 is a plate 148 that in its edge has worm teeth 149 which are engaged by a worm 150 mounted in the plate 147, Figs. 9, 12, 13. By turning this worm the shaft 127 and chain sprocket 126 may be adjusted with relation to the driving pinions and racks so that the elevator will properly coordinate with the other mechanisms.

The mechanisms are driven from the main cam shaft 141 fastened to which is a gear 151, Figs. 2, 3, 15, that is engaged by a pinion 152 on a shaft 153 provided with a gear 154 which is engaged by a pinion 155 on a shaft 156, Fig. 15. This shaft extends through the frame and on one side of the machine has a driving pulley 157, Fig. 1.

As an elevator blade is carried up it passes between the saddle plates into a filler and lifts the filler therefrom. As the filler rises from the saddle it is pressed down and leveled on the elevator blade by a plate 158 which is swung in and down from the position shown in Fig. 6 to that shown in Fig. 23. The leveler plate is adjustably fastened to a block 159 which has a goose neck shank 160. The block 159 is pivoted between one end of rockers 161 that are loose on the shaft 41, the other end of one of these rockers being connected by a link 162 with an end of a rocker 163 that is fixed to a shaft 164. The lower end of the goose neck 160 is pivoted to the other end of the rocker 163, Figs. 6, 23. Fastened to the shaft 164 is a pinion 165 that is engaged by a segmental rack 166 to which the upper end of a link 167 is connected, Figs. 6, 8, 23. The lower end of this link is elastically connected by a spring 168 and cylinder 169 with the end of an angle lever 170, Figs. 8, 15, that is pivoted on the shaft 140 and is engaged with a cam 171, Fig. 3. The rotation of this cam through these connecting means swings the leveler plate quickly in and down onto the back of the filler and then up and out from the path of the filler as it is lifted.

As the filler is carried up by an elevator blade it is passed between rolls which are moved from each side toward the filler and apply adhesive, preferably paste, to the outer leaves. The rolls 172 are supplied with paste by rolls 173 that are rotated in glue tanks 174, Fig. 10. The tanks on their lower edges have flanges 175 that are free to move in tracks 176, Figs. 10, 15, 17. The bottoms of the glue tanks are connected by links 177 with the upper ends of levers 178, Figs. 10, 15. The levers 178 turn loosely on shafts 179, Fig. 6. Fastened to the shafts 179 are arms 180 which carry spring plungers 181. Studs 182 project from the levers 178 between these plungers and lugs 183 on the levers, Fig. 6. When the arms 180 are turned to move the rolls 172 against a filler the plungers cushion the pressure of the rolls against the filler. Fastened to the shafts 179 are rockers 184 that have segmental racks 185 which inter-mesh so that the shafts will oscillate synchronously and move the tanks in and out uniformly. Fastened to one of the shafts 179 is an arm 186. The arm 186 is connected by a link 187 with an angle lever 188, Figs. 2, 8, 15, that is actuated by a cam 189, Fig. 3. By this means the paste tanks are simultaneously moved toward and from a filler at the required times to apply paste to the outer sides of the filler, and then move away to permit the following filler to pass up.

On one end of each of the axles of the paste rolls 172 is a pinion 190 that is engaged by a gear 191 fastened to the axle of the supply roll 173, Fig. 6. The gear 191 has sockets 192 which receive pins 193 that are carried by the head 194 of a shaft 195, Fig. 17. A disk 196 at the end of a stem 197 engages with these pins, and a spring 198 thrusts against this plate to normally cause the pins to enter the sockets and conect the shaft 195 with the gear 191. The outer end of the stem 197 has a button 199. When this button is pulled out the pins are withdrawn so as to disconnect the gear from the shaft and permit the tank to be removed.

Fastened to each shaft 195 is a worm 200 that is engaged by a worm wheel 201, Figs. 8, 17, which is connected with a shaft 202 so as to rotate therewith but have a longitudinal movement thereon by a roll 203 in a slotted block 204 that is slidable in a slot 205 in the hub 206 of worm wheel 201, Figs. 16, 17.

The bearings for the coupling shaft 195 and the worm 200 and worm wheel 201 are in plates 207 that are movably supported in ways 208 in the frame, Figs. 16, 17, so that the shafts 195, worms 200 and worm wheels 201 will be moved in and out with the paste tanks, the worm wheels sliding along the shaft 202, through the connection of the shafts 195 with the gears 191 by means of the pins 193.

The paste applying rolls are normally rotated in the direction of the upward movement of the filler, and at the same surface speed but just preceding the engagement of the rolls with the filler the rolls are given a slight reverse rotatory movement in order to accummulate an extra quantity of paste and apply it as they start to roll against the sides of the filler, at the joint that is directly under the formed back of the filler.

Loose on the shaft 202 is a pinion 209 to the hub 210 of which is fastened a disk 211 that carries a pawl 212 designed to engage notches in a disk 213, Figs. 16, 18, 19. Projecting from the disk 211 into a groove 214 in the disk 213 is a stud 215, Figs. 18, 20, and extending through the disk 213 are two pins 216 that are normally retracted by springs 217, Fig. 20. The outer ends of these pins bear rolls 218 that engage a cam 219 which is fixed to a bracket 220 that is fastened to the frame of the machine, Figs. 16, 20.

The pinion 209 is engaged by a segmental rack 221 on one end of an angle lever 222, Fig. 15. The other end of this lever is connected by a link 223 with an angle lever 224 that is actuated by a cam 225, Fig. 3. This cam causes the rack 222 to rotate the pinion 209 forward and back, and when moving forward the pawl 212 engages the disk 213 and rotates the shaft 202, and when moving backward the pawl slides over the disk and the shaft 202 remains idle except at the period that the fixed cam 219 pushes in a pin 216 so that it will engage with a pin 215, Figs. 18, 19, 20. At this interval the shaft 202 is given a short reverse movement which gives a slight reverse movement to the paste rolls for the purpose of causing them to accumulate the extra amount of paste which is applied at the joints of the filler.

The elevator chain feed cam is timed to give the filler a slight dwell as the rolls apply adhesive to the joints, and then to lift the filler between the rolls up to the case. The case and filler are then lifted together and the sides of the case are folded down against the paste coated sides of the filler by the wire yokes 226, Figs. 6, 7, which are rotatably mounted on spindles 227 on the rails 70 and that are pressed down by springs 228, Figs. 7, 9.

As the encased filler is carried up from the paste rolls it passes between rolls 229, Figs. 6, 9, 10, that press the case against the pasted sides of the filler and hold the book from opening. These rolls are at the ends of shafts 230 mounted in bearings on arms 231 that are movable horizontally toward and from the book on track bars 232 that extend across the frame of the machine, Figs. 6, 9, 10. Springs 233 are arranged on the shafts to cushion the pressure of the rolls against the case. In order that the press roll arms move coincidentally they are provided with racks 234 which are engaged by a gear 235, Fig. 6.

Connected with one of the arms 231, with an interposed cushioning spring 236, is a rack 237 that engages with a long vertically arranged segmental gear 238, Fig. 10. The hub 239 of this segmental gear is fastened to the upper end of a shaft 240. On the lower end of this shaft is a segmental rack 241 meshing with a segmental rack 242 on a horizontal shaft 243, Figs. 1, 6. At the other end of the shaft 243 is a rocker arm 244 that by a link 245 is connected with an angle lever 246 which is actuated by a cam on the inside of the cam disk 247, Fig. 1. By the rotation of this cam the arms with the press rolls are opened and closed at the correct times.

The arms 231 carry plates 248, Figs. 9, 10, that are designed to engage the front edge of the filler and lift the book from the elevator blade to position to be grasped by the discharge jaws 249. The lifting plates 248 and the press rolls 229 being mounted on the same arms 231, open and close and are lifted and lowered together. For the purpose of raising and lowering the rolls and plates, the track bars 232 on which the arms 231 are horizontally movable, have their ends supported by slides 250 that are movable up and down ways 251, Figs. 9, 10. On the back of these slides are racks 252 which are engaged by pinions 253, Figs. 6, 9. These pinions are fixed to a shaft 254 on the end of which outside of the frame is a pinion 255, Fig. 6, that is engaged by a segmental rack 256 on the end of a rocker 257, Figs. 9, 10. This rocker is connected by a link 258 with the end of an angle lever 259 which is actuated by a cam in the disk 260 on the shaft 241, Fig. 9. This cam through these mechanisms causes the bars 232 to raise and lower the press rolls and lifting plates at the desired times.

When the encased filler is sufficiently lifted the jaws 249 are closed and grasp the book at the joints, 261, then the jaws swing up, lifting the book from the elevator blade and carrying it over and finally opening and dropping it onto the delivery chute 262, Fig. 1.

The jaws 249 are at the ends of arms 263 that are splined on a shaft 264. Attached to the hubs of the arms are racks 265 that are engaged by a gear 266 fastened on the shaft 264, Fig. 6. A spring 267 pressing against the hub of one arm, by means of the racks and gear, tends to close the arms and the jaws which they carry.

Pins 268 are fastened to the arm hub against which the spring 267 thrusts. These pins extend loosely through the hub of the other arm and engaging the ends of the pins is a bearing collar 269 which is free to slide on the shaft 264. Abutting against this bearing collar is a grooved collar 270 that is engaged by the upper end of an angle lever 271, Figs. 6, 10. The other end of this lever is connected by a link 272 with a rocker 273 on one end of a shaft 274, Figs. 1, 6. On the other end of the shaft 274 is a rocker 275 that is connected by a link 276 with the end of an angle lever 277 that is actuated by a cam in the disk 278 on the shaft 241, Fig. 1. This cam is timed to during the proper periods cause the lever 271, through the pins 268 and racks 265 and gear 266 to open the jaws 249 for releasing a book and holding them open until they receive a following book, the spring 267 closing the jaws for gripping and carrying a book over to the discharge chute.

On the end of the shaft 264 is a gear 279 that is engaged by a segmental rack 280 on an angle lever 281, Figs. 6, 9, 10. The lever 281 is connected by a link 282 with a lever 283 that is actuated by cam in the cam disk 284, Fig. 9. This mechanism is so timed that when the jaws 249 have grasped a book the arms 263 are swung over approximately 180° and then opened so as to drop the book into the discharge chute 262, as illustrated in Fig. 1.

When the machine is running the fillers passed in by the operative are in succession fed by the first feed finger to the second feed finger and by the latter to the clamp jaws which place them on the saddle plates upon which they are headed, that is, located in correct position, and from which they are lifted by the elevator blades. As they are raised from the saddle they are pressed down and leveled on the blades. The upward movement of the elevator blades then carries the fillers between the paste rolls. As the paste rolls are brought up against the fillers they are given a slight reverse movement so as to apply a considerable quantity of paste at the joints, and then given a movement in the same direction as the upward passing fillers to coat the outer leaves of the fillers with adhesive. In the meanwhile, the cases are carried from the stack in the magazine, one at a time in succession to the means which form the backs and creases, or joints, and from the back-forming means they are carried to a position over the saddle and paste rolls. If no filler is grasped by the clamp jaws and carried to the saddle the case feed is interrupted so no case will be fed from the magazine. As the fillers leave the paste rolls in their upward movement they are carried to the cases and during the continued upward movement of the fillers and cases the cases are folded down against the pasted surfaces of the fillers. When the cased fillers have passed up sufficiently high the lifting plates engage the front edges of the book and lift it up until it is in position to be grasped at the joints by the discharge jaws, that then swing over 180° and lift the books off from the elevator blades and deposit them in a discharge chute.

The invention claimed is:

1. A casing-in machine comprising means for successively feeding fillers, means for receiving the fed fillers and carrying them inward, means which open the fillers as they are carried inward, a saddle upon which the fed fillers are deposited, means for heading the fillers on the saddle, elevator blades for lifting the fillers from the saddle, means for leveling the fillers on said blades, rolls movable toward and from the path of the fillers for applying adhesive to the sides of the fillers, means for rotating said rolls first opposite to and then in the same direction as the upward movement of the fillers, a case magazine, means for feeding cases successively from the magazine into the path of the fillers, a former for shaping the backs of the cases as they are fed, means for folding the cases against the adhesive-coated sides of the fillers, means for pressing and lifting the cased fillers from the elevator blades, means which grasp the cased fillers at the backs and remove them from the path of the elevator blades and deposit them on a discharge chute, and means actuated from the filler feeding means for disconnecting the case feeding means upon the failure of the filler feed to receive a filler.

2. A casing-in machine comprising means for successively feeding fillers, means for receiving the fed fillers and carrying them inward, means which open the fillers as they are carried inward, a saddle upon which the fed fillers are deposited, means for heading the fillers on the saddle, elevator blades for lifting the fillers from the saddle, means for leveling the fillers on said blades, rolls movable toward and from the path of the fillers for applying adhesive to the sides of the fillers, means for rotating said rolls first opposite to and then in the same direction as the upward movement of the fillers, a case magazine, means for feeding cases successively from the magazine into the path of the fillers, a former for shaping the backs of the cases as they are fed, means for folding the cases against the adhesive-coated sides of the fillers, means for pressing and lifting the cased fillers from the elevator blades, and means which grasp the cased fillers at the backs and remove them from the path of the elevator blades and deposit them on a discharge chute.

3. A casing-in machine comprising means for successively feeding fillers, means for receiving the fed fillers and carrying them inward, means which open the fillers as they are carried inward, a saddle upon which the fed fillers are deposited, elevator blades for lifting the fillers from the saddle, means for leveling the fillers on said blades, rolls movable toward and from the path of the fillers for applying adhesive to the sides of the fillers, means for rotating said rolls first opposite to and then in the same direction as the upward movement of the fillers, a case magazine, means for feeding cases successively from the magazine into the path of the fillers, a former for shaping the backs of the cases as they are fed, means for folding the cases against the adhesive-coated sides of the fillers, means for pressing and lifting the cased fillers from the elevator blades, and means which grasp the cased fillers at the backs and remove them from the path of the elevator blades and deposit them on a discharge chute.

4. A casing-in machine comprising means for successively feeding fillers, means for receiving the fed fillers and carrying them inward, a saddle upon which the fed fillers are deposited, means for heading the fillers on the saddle, elevator blades for lifting the fillers from the saddle, means for leveling the fillers on said blades, rolls movable toward and from the path of the fillers for applying adhesive to the sides of the fillers, means for rotating said rolls first opposite to and then in the same direction as the upward movement of the fillers, a case magazine, means for feeding cases successively from the magazine into the path of the fillers, a former for shaping the backs of the cases as they are fed into the path of the fillers, means for folding the cases against the adhesive-coated sides of the fillers, means for pressing and lifting the cased fillers from the elevator blades, and means which grasp the cased fillers at the backs and remove them from the path of the elevator blades and deposit them on a discharge chute.

5. A casing-in machine comprising means for successively feeding fillers, means for receiving the fed fillers and carrying them inward, means which open the fillers as they are carried inward, a saddle upon which the fed fillers are deposited, means for heading the fillers on the saddle, elevator blades for lifting the fillers from the saddle, rolls movable toward and from the path of the fillers for applying adhesive to the sides of the fillers, means for rotating said rolls first opposite to and then in the same direction as the upward movement of the fillers, a case magazine, means for feeding cases successively from the magazine into the path of the fillers, a former for shaping the backs of the cases as they are fed, means for folding the cases against the adhesive-coated sides of the fillers, means for pressing and lifting the cased fillers from the elevator blades, and means which grasp the cased fillers at the backs and remove them from the path of the elevator blades and deposit them on a discharge chute.

6. A casing-in machine comprising means for successively feeding fillers, means for receiving the fed fillers and carrying them inward, means which open the fillers as they are carried inward, a saddle upon which the fed fillers are deposited, elevator blades for lifting the fillers from the saddle, rolls movable toward and from the path of the fillers for applying adhesive to the sides of the fillers, means for rotating said rolls first opposite to and then in the same direction as the upward movement of the fillers, a magazine for retaining cases, means for feeding cases successively from the magazine, a former for shaping the backs of the cases as they are fed into the path of the fillers, means for folding the cases against the adhesive-coated sides of the fillers, means for pressing and lifting the cased fillers from the elevator blades, and means which grasp the cased fillers at the backs and remove them from the path of the elevator blades and deposit them on a discharge chute.

7. A casing-in machine comprising means for successively feeding fillers, means for receiving the fed fillers and carrying them inward, a saddle upon which the fed fillers are deposited, elevator blades for lifting the fillers from the saddle, rolls movable toward and from the path of the fillers for applying adhesive to the sides of the fillers, means for rotating said rolls first opposite to and then in the same direction as the upward movement of the fillers, a case magazine, means for feeding cases successively from the magazine into the path of the fillers, a former for shaping the backs of the cases as they are fed, means for folding the cases against the adhesive-coated sides of the fillers, means for pressing and lifting the cased fillers from the elevator blades, and means which grasp the cased fillers at the backs and remove them from the path of the elevator blades and deposit them on a discharge chute.

8. A casing-in machine comprising means for successively feeding fillers, means for receiving the fed fillers and carrying them inward, means which open the fillers as they are carried inward, a saddle upon which the fed fillers are deposited, means for heading the fillers on the saddle, elevator blades for lifting the fillers from the saddle, means for leveling the fillers on said blades, rolls movable toward and from the path of the fillers for applying adhesive to the sides of the fillers, means for rotating said rolls first opposite to and then in the same direction as the upward movement of the fillers, a case magazine, means for feeding cases successively from the magazine into the path of the upward moving fillers, means for folding the cases against the adhesive-coated sides of the fillers, means for pressing and lifting the cased fillers from the elevator blades, and means which grasp the cased fillers at the backs and remove them from the path of the elevator blades and deposit them on a discharge chute.

9. A casing-in machine comprising means for successively feeding fillers, means for receiving the fed fillers and carrying them inward, means which open the fillers as they are carried inward, a saddle upon which the fed fillers are deposited, means for heading the fillers on the saddle, elevator blades for lifting the fillers from the saddle, means for leveling the fillers on said blades, rolls movable toward and from the path of the fillers for applying adhesive to the sides of the fillers, means for rotating said rolls first opposite to and then in the same direction as the upward movement of the fillers, a case magazine, means for feeding cases successively from the magazine into the path of the fillers, a former for shaping the backs of the cases as they are fed, means for pressing and lifting the cased fillers from the elevator blades, and means which grasp the cased fillers at the backs and remove them from the path of the elevator blades and deposit them on a discharge chute.

10. In combination in a casing-in machine, a plurality of reciprocatory and oscillatory fingers for successively feeding in fillers, oscillatory and reciprocatory clamp jaws for receiving the fillers from said fingers and carrying them inward to a saddle, a blade which opens the fillers as they are carried onto the saddle, said saddle comprising a pair of separated, vertically fixed plates upon which said jaws leave the fillers, oscillatory and transversely movable means for heading the fillers on the saddle, an elevator comprising an intermittently movable endless chain with blades which pass upward through the saddle for lifting the fillers from the saddle, and oscillatory means for leveling the fillers on the saddle.

11. In combination in a casing-in machine, a plurality of reciprocatory and oscillatory fingers for successively feeding in fillers, oscillatory and reciprocatory clamp jaws for receiving the fillers from said fingers and carrying them inward to a saddle, a blade which opens the fillers as they are carried onto the saddle, said saddle comprising a pair of separated, vertically fixed plates upon which said jaws leave the fillers, an elevator comprising an intermittently movable endless chain with blades which pass upward through the saddle for lifting the fillers from the saddle, and oscillatory means for leveling the fillers on the saddle.

12. In combination in a casing-in machine, a plurality of reciprocatory and oscillatory fingers for successively feeding in fillers, oscillatory and reciprocatory clamp jaws for receiving the fillers from said fingers and carrying them inward to a saddle, a blade which opens the fillers as they are carried onto the saddle, said saddle comprising a pair of separated, vertically fixed plates upon which said jaws leave the fillers, oscillatory and transversely movable means for heading the fillers on the saddle, and an elevator comprising an intermittently movable endless chain with blades which pass upward through the saddle for lifting the fillers from the saddle.

13. In combination in a casing-in machine, a plurality of reciprocatory and oscillatory fingers for successively feeding in fillers, oscillatory and reciprocatory clamp jaws for receiving the fillers from said fingers and carrying them inward to a saddle, a blade which opens the fillers as they are carried onto the saddle, said saddle comprising a pair of separated, vertically fixed plates upon which said jaws leave the fillers, and an elevator comprising an intermittently movable endless chain with blades which pass upward through the saddle for lifting the fillers from the saddle.

14. In combination in a casing-in machine, a plurality of reciprocatory and oscillatory fingers for successively feeding in fillers, oscillatory and reciprocatory clamp jaws for receiving the fillers from said fingers and carrying them inward to a saddle, said saddle comprising a pair of separated, vertically fixed plates upon which said jaws leave the fillers, and an elevator comprising an intermittently movable endless chain with blades which pass upward through the saddle for lifting the fillers from the saddle.

15. In combination in a casing-in machine, blades for intermittently elevating fillers, a magazine for retaining cases, horizontally reciprocated means for feeding cases successively from the magazine to a back-former, said back-former comprising plates for creasing the joints and a vertically movable heated former for shaping the backs of the cases while held by said creasing plates, horizontally reciprocated means for feeding the cases from the back-former into the path of the upward moving fillers, means for folding the cases against the upward moving sides of the fillers, horizontally and vertically movable press rolls and lifting plates which receive and lift the cased fillers, and reciprocatory and oscillatory jaws which grasp the cased fillers at the backs and remove them from the path of the elevator blades and deposit them on a discharge chute.

16. In combination in a casing-in machine, blades for intermittently elevating fillers, a magazine for retaining cases, horizontally reciprocated means for feeding cases successively from the magazine to a back-former, said back-former comprising plates for creasing the joints and a vertically movable heated former for shaping the backs of the cases while held by said creasing plates, horizontally reciprocated means for feeding the cases from the back-former into the path of the upward moving fillers, horizontally and vertically movable press rolls and lifting plates which receive and lift the cased fillers, and reciprocatory and oscillatory jaws which grasp the cased fillers at the backs and remove them from the path of the elevator blades and deposit them on a discharge chute.

17. In combination in a casing-in machine, blades for intermittently elevating fillers, a magazine for retaining cases, horizontally reciprocated means for feeding cases successively from the magazine to a back-former, said back-former comprising plates for creasing the joints and a vertically movable heated former for shaping the back of the cases while held by said creasing plates, horizontally reciprocated means for feeding the cases from the back-former into the path of the upward moving fillers, and reciprocatory and oscillatory jaws which grasp the cased fillers at the backs and remove them from the path of the elevator blades and deposit them on a discharge chute.

18. In combination in a casing-in machine, blades for intermittently elevating fillers, a magazine for retaining cases, a back-former comprising plates for creasing the joints and a vertically movable heated former for shaping the backs of the cases while held by said creasing plates, horizontally reciprocated means for successively feeding the cases to the back-former and from the back-former into the path of the upward moving fillers, and reciprocatory and oscillatory jaws which grasp the cased fillers at the backs and remove them from the path of the elevator blades and deposit them on a discharge chute.

19. In combination in a casing-in machine, intermittently movable blades for elevating the cased fillers, horizontally and vertically movable press rolls and lifting plates which receive, grasp and lift the cased fillers from said blades, and reciprocatory and oscillatory jaws which grasp the backs of the cased fillers thus lifted and remove them from the path of the elevator blades and deposit them on a discharge chute.

20. In combination in a casing-in machine, intermittently movable blades for elevating the cased fillers, horizontally and vertically movable press rolls and lifting plates which receive and lift the cased fillers from said blades, reciprocatory and oscillatory jaws, and mechanism for opening and closing said jaws horizontally and for oscillating said jaws substantially 180° whereby the jaws will grasp the cased fillers at the backs and remove them from the path of the elevator blades and deposit them on a discharge chute.

21. In combination in a casing-in machine, intermittently movable blades for elevating cased fillers, horizontally and vertically movable press rolls and lifting plates, and mechanisms for horizontally opening and closing and vertically lifting and lowering said rolls and plates, so they will receive and lift the cased fillers from said blades.

22. In combination in a casing-in machine, intermittently movable blades for elevating cased fillers, reciprocatory and oscillatory jaws, and mechanisms for horizontally opening and closing and vertically oscillating said jaws so they will receive and grasp the cased fillers and swing them up and out of the path of said blades.

23. In combination in a casing-in machine, an elevator comprising an endless chain with projecting blades, mechanism for feeding fillers into the upward path of said blades, mechanism for feeding cases into the path of said blades, and mechanism actuated from the filler feed mechanism for arresting the operation of the case feeding mechanism upon the failure of the filler feed mechanism to feed a filler.

24. In combination in a casing-in machine, an elevator comprising an endless chain with projecting blades, mechanism comprising oscillatory and reciprocatory jaws for feeding fillers into the upward path of said blades, mechanism for feeding cases into the path of said blades, and mechanism actuated from said jaws for arresting the operation of the case feeding mechanism upon the failure of the filler feed mechanism to feed a filler.

25. In combination in a casing-in machine, an elevator comprising an endless chain with projecting blades, mechanism comprising oscillatory and reciprocatory jaws for feeding fillers into the upward path of said blades, slides for feeding cases into the path of said blades, mechanism for reciprocating said slides, and mechanism actuated from said jaws, for stopping the reciprocation of said slides and arresting the feed of cases upon the failure of the filler feed mechanism to feed a filler.

26. In combination in a casing-in machine, an elevator comprising an endless chain with projecting blades, mechanism comprising oscillatory and reciprocatory jaws for grasping and feeding fillers into the upward path of said blades, slides for feeding cases into the path of said blades, mechanism for reciprocating said slides, and mechanism actuated by the failure of said jaws to grasp and feed a filler, for arresting the reciprocation of said slides.

27. In combination in a casing-in machine, an elevator comprising an endless chain with projecting blades, a magazine for retaining cases, mechanism for feeding cases successively from the magazine, means for creasing the joints and forming the backs of the cases fed from the magazine, and mechanism for feeding the cases from said back-former into the path of the upward movement of said blades.

28. In combination in a casing-in machine, an elevator comprising an endless chain with projecting blades, a magazine for retaining cases, mechanism for feeding cases successively from the magazine, horizontally arranged plates for creasing the joints of the cases fed from the magazine, a vertically movable head for forming the backs of the cases when held by said plates, and mechanism for feeding the cases from said joint creasers and the back-former into the path of the upward movement of said blades.

29. In combination in a casing-in machine, an elevator comprising an endless chain with projecting blades, a magazine for retaining cases, mechanism for feeding cases successively from the magazine, horizontally and vertically adjustable plates for creasing the joints and a vertically movable heated head for forming the backs of the cases fed from the magazine, and mechanism for feeding the cases from said back-former into the path of the upward movement of said blades.

30. In combination in a casing-in machine, an elevator comprising an endless chain with projecting blades for lifting fillers, sprocket wheels carrying said chain, a pair of gears loosely mounted with relation to the axle of one of said wheels, ratchet and pawl means connecting each gear with said axle, a segmental rack engaging each gear, and a cam for actuating each rack, said cams being so related that the racks and gears alternate in feeding the elevator chain.

31. In combination in a casing-in machine, an elevator comprising an endless chain with projecting blades for lifting fillers, sprocket wheels carrying said chain, a pair of gears loosely mounted with relation to the axle of one of said wheels, ratchet and pawl means connecting each gear with said axle, means for angularly adjusting the relation of the ratchets to the pawls, a segmental rack engaging each gear, and a cam for actuating each rack, said cams being so related that the racks and gears alternate in feeding the elevator chain.

32. In combination in a casing-in machine, an elevator comprising an endless chain with projecting blades for lifting fillers, sprocket wheels carrying said chain, a pair of gears loosely mounted with relation to the axle of one of said wheels, ratchet and pawl means connecting each gear with said axle, a rack engaging each gear, and means for actuating said racks alternately.

33. In combination in a casing-in machine, an elevator comprising an endless chain with projecting blades for lifting fillers, sprocket wheels carrying said chain, a pair of gears loosely mounted with relation to the axle of one of said wheels, ratchet and pawl means connecting each gear with said axle, means for angularly adjusting the relation of the ratchets to the pawls, a rack engaging each gear, and means for actuating said racks alternately.

CARL SCHRAMM.
ERNEST WAYNE CLARK.